C. E. BRADLEY.
METHOD OF MANUFACTURING RUBBER FOOTWEAR.
APPLICATION FILED AUG. 3, 1917.
1,271,843.
Patented July 9, 1918.
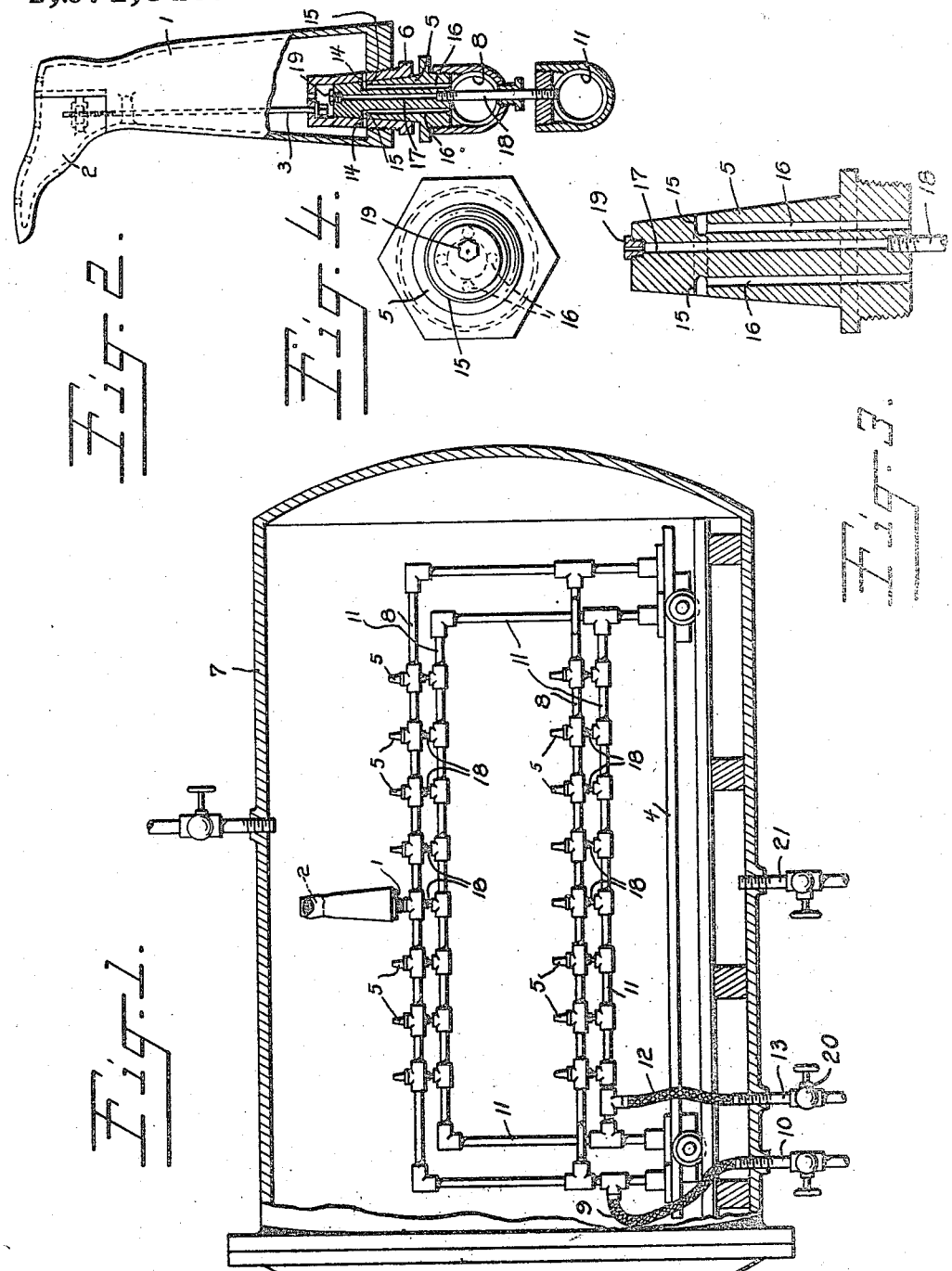
Attest:
S. G. Taylor
Inventor:
Charles E. Bradley
by Ernest Hopkinson, his Atty.

UNITED STATES PATENT OFFICE.

CHARLES E. BRADLEY, OF MISHAWAKA, INDIANA, ASSIGNOR TO MISHAWAKA WOOLEN MANUFACTURING COMPANY, A CORPORATION OF INDIANA.

METHOD OF MANUFACTURING RUBBER FOOTWEAR.

1,271,843. Specification of Letters Patent. Patented July 9, 1918.

Application filed August 3, 1917. Serial No. 184,220.

*To all whom it may concern:*

Be it known that I, CHARLES E. BRADLEY, a citizen of the United States, residing at Mishawaka, county of St. Joseph, and State of Indiana, have invented certain new and useful Improvements in the Methods of Manufacturing Rubber Footwear, of which the following is a full, clear, and exact description.

This invention relates to the method of manufacturing articles of rubber footwear, more particularly to the vulcanization step in the manufacture of rubber boots. The object of this invention is to provide a method of treating the built up boots on their lasts, whereby the vulcanization may be carried out by subjecting them to the action of steam at a vulcanizing temperature.

Heretofore it has been impossible to satisfactorily vulcanize certain lines of rubber footwear in an atmosphere of steam unless the medium replaced by the steam had been first heated, owing to the fact that the articles about to be vulcanized are relatively cold, and upon contact with their cold surface some of the steam is condensed, with resultant spotting of the articles. For this reason steam has never been satisfactorily used as a vulcanizing medium in the manufacture of articles requiring a uniformly colored surface. Except for the above mentioned objection, however, steam is one of the most effective vulcanizing mediums, owing to the fact that it rapidly conducts the heat to the article being treated, and also in that it has no deleterious oxidizing effect upon the rubber.

By this invention I provide a method of utilizing steam as a vulcanizing medium in the manufacture of rubber boots and shoes and other articles, and at the same time avoid the danger of spotting the surface of the articles by the condensation of the steam thereon. This I accomplish by raising the temperature of the articles from the interior, before subjecting them exteriorly to the action of the steam, preferably by circulating a heated fluid, for instance, steam or air, in the case of boots, through the hollow lasts upon which they are built. This preliminary heating may be carried out before or after the boots are introduced into the vulcanizing chamber.

In the accompanying drawing I have shown an apparatus suitable for carrying out my invention, the same forming subject matter of a separate application. Referring to the drawings:—

Figure 1 is a view partly in elevation and partly in section of a vulcanizing chamber with a boot-supporting rack-car therein;

Fig. 2 is a similar view of a boot last, showing in detail the connections with the rack-car;

Fig. 3 is a longitudinal sectional view of a nipple for supporting a last on the rack-car, and Fig. 4 is a plan view of the same.

In carrying out my method the boots are built up according to the usual procedure upon a suitable hollow last 1 having a separable toe portion 2 to permit its removal from the finished boot. As is usual in lasts of this type, the parts 1 and 2 are fastened together by a bolt 3. The vulcanization is carried out by mounting the lasts upon a rack-car 4 provided with a plurality of tapered nipples 5 which are adapted to form a substantially air-tight connection with correspondingly tapered bushings 6 in the ends of the lasts, introducing the car with the boots thereon into the vulcanizing chamber 7, and there subjecting them to the action of a heated medium, in this instance superheated steam, for the required length of time. The rack-car which I utilize is built of hollow piping 8 which communicates with the nipples 5 and is provided with a flexible connection 9 which is adapted to be coupled to an exhaust or suction pipe 10.

The arrangement as thus far described is that ordinarily employed in the manufacture of rubber boots by the so-called differential pressure method, wherein the exterior of the article is subjected to fluid pressure, and the interior to a lesser pressure whereby the articles being treated are compacted during the cure.

To permit the preliminary interior heating of the lasts, I provide on the rack-car an additional arrangement of pipes 11 also connected with the tapered nipples 5, and provided with a flexible connection 12 to be coupled with a steam or hot air pipe 13.

An arrangement of the connections for the last with the pipe 8, and pipe 11 respectively which I have found satisfactory is as follows:—

The bushing 6, which is permanently seated in the last 1, projects a short distance into the interior of the last, and is provided with a plurality of openings 14 which register with a groove or channel 15 in the nipple 5. A plurality of passages 16 through the nipple connect this groove or channel 15 with the exhaust or vacuum pipe 8. A passage 17 through the nipple is connected with the steam or hot air pipe 11 by a tube or pipe 18, and is preferably provided at its inner end with a suitable nozzle 19.

To heat the interior of the last, steam or hot air is introduced through the pipe 13 and flexible connection 12 into the pipes 11 and thus through the tube 18 and passage 17 into the interior of the last in which it circulates, exhausting through the ports 14, channel 15, passages 16, pipe 8, connection 9, and pipe 10. If desired, this preliminary heating step may be carried on by connecting the rack-car with the pipe 13 before its introduction into the chamber 7. The heating fluid is allowed to circulate in the last as above set forth until the boot thereon is heated to the desired degree to prevent the condensation of the steam that is later applied to the exterior of the articles. By a valve 20 in the pipe 13, the supply of steam or hot air is then cut off, and if the heating step was carried on outside of the vulcanizer, the car is introduced therein. The steam is next introduced into the vulcanizer through the pipe 21, and its circulation continued therein under suitable pressure until vulcanization of the articles is completed.

In addition to preventing the injurious effect of condensed steam on the articles, my method greatly shortens the time required for vulcanization, owing to the fact that the articles may be interiorly heated to nearly the vulcanizing temperature before the exterior vulcanizing medium is introduced. In this way a saving of time is realized, even though the internal heating step is carried on in the vulcanizing chamber, because the time required to heat the boots by introducing the hot fluid in the interior of the lasts is much less than that required to bring them to the vulcanizing temperature by the surrounding medium. Of course, in case the preliminary heating is carried on outside the chamber a still greater saving is effected.

In carrying out the actual vulcanization I ordinarily continue to subject the interior of the last to a lesser pressure than that of the surrounding medium, the interior heating system in no way preventing this, since by closing the valve 20 the lesser pressure is made to act on the interior of the lasted boots, the last being perforated for the purpose which, however, applicant does not claim broadly as his invention.

To heat the interior of the lasts, I preferably employ steam, but the same result can be obtained by air heated to the proper degree.

Articles of footwear vulcanized in an atmosphere of steam as made possible by this invention, are found to be superior to those vulcanized according to the usual hot air method, owing to the fact that the injurious oxidizing effect of hot air is avoided. Steam is also superior in that it effects the vulcanization in a much shorter time than is possible by the use of air.

Having thus described my invention, what I claim and desire to protect by Letters Patent is:

1. The method of vulcanizing articles containing rubber which consists in heating the article by the application of a heating medium applied to one side thereof while maintaining the opposite side free from contact with a condensable heating medium and when the article has been sufficiently heated to prevent condensation thereon, then subjecting the opposite side to a condensable heating medium at a vulcanizing temperature.

2. The method of vulcanizing hollow articles containing rubber which consists in heating the article from the interior thereof to a degree of temperature above the condensing point of steam while maintaining the exterior free from contact with steam and thereafter subjecting the exterior of the article to the action of steam at a vulcanizing temperature.

3. The method of vulcanizing articles containing rubber which consists in heating the article by the application of a heating medium applied to one side thereof to a degree of temperature above the condensing point of steam while maintaining the opposite side free from contact with steam and thereafter subjecting the opposite side to the action of steam at a vulcanizing temperature.

4. The method of vulcanizing hollow articles containing rubber which consists in heating the article by the application of a heating medium applied to the interior of the article while maintaining the exterior free from contact with a condensable heating medium and when the article has been sufficiently heated to prevent condensation thereon then subjecting the exterior to a condensable heating medium at a vulcanizing temperature.

5. The method of vulcanizing an article containing rubber which consists in supporting the article upon a hollow form, heating the article to a temperature above the condensing point of steam by circulating the heated fluid in the interior of the form while maintaining the exterior free from contact with a condensable heating medium and thereafter subjecting the exterior of the article to the action of steam at a vulcanizing temperature.

6. The method of vulcanizing a hollow article containing rubber which comprises supporting the article upon a hollow form, circulating the heated medium within the form while maintaining the exterior free from contact with a condensable heating medium, and then exposing the exterior of the article to a condensable medium at a vulcanizing temperature while maintaining the interior under a lesser pressure.

7. The method of vulcanizing articles containing rubber which consists in heating the article by the application of a heating medium applied to one side thereof while maintaining the opposite side free from contact with a condensable heating medium when the article has been sufficiently heated to prevent condensation thereon then subjecting the opposite side to a condensable heating medium at a vulcanizing temperature and simultaneously therewith or subsequent thereto subjecting the article to a differential of pressure.

Signed at New York, county of New York, State of New York, this 1st day of August, 1917.

CHARLES E. BRADLEY.

Copies of this patent may be obtained for five cents each, by addressing the "Commissioner of Patents, Washington, D. C."